(No Model.)

G. W. WRIGHT.
PNEUMATIC DOOR CHECK.

No. 478,388. Patented July 5, 1892.

Witnesses,
J. H. Shumway
Lillian D. Kelsey

Granville W. Wright
Inventor
By atty.
Earle Seymour

UNITED STATES PATENT OFFICE.

GRANVILLE W. WRIGHT, OF NEW HAVEN, CONNECTICUT, ASSIGNOR TO THE SARGENT & COMPANY, OF SAME PLACE.

PNEUMATIC DOOR-CHECK.

SPECIFICATION forming part of Letters Patent No. 478,388, dated July 5, 1892.

Application filed January 6, 1892. Serial No. 417,145. (No model.)

*To all whom it may concern:*

Be it known that I, GRANVILLE W. WRIGHT, of New Haven, in the county of New Haven and State of Connecticut, have invented a new Improvement in Door-Checks; and I do hereby declare the following, when taken in connection with accompanying drawings and the letters of reference marked thereon, to be a full, clear, and exact description of the same, and which said drawings constitute part of this specification, and represent, in—

Figure 1:
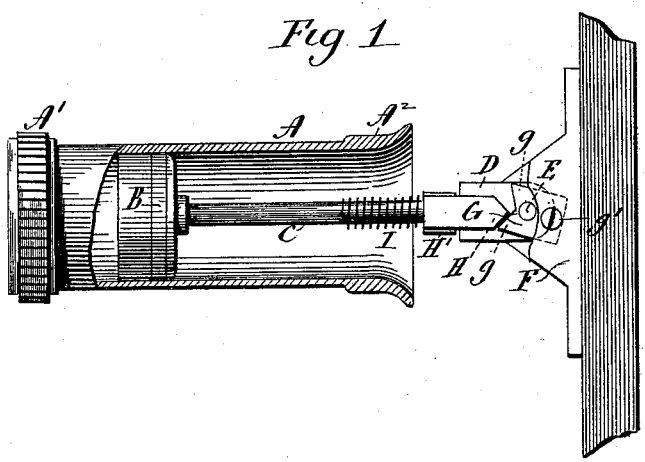
Figure 2:
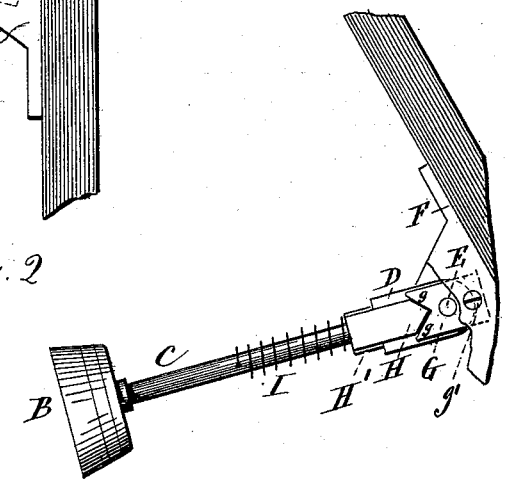
Figure 3:
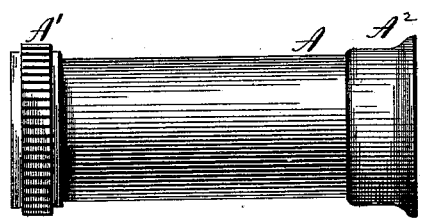
Figure 3:
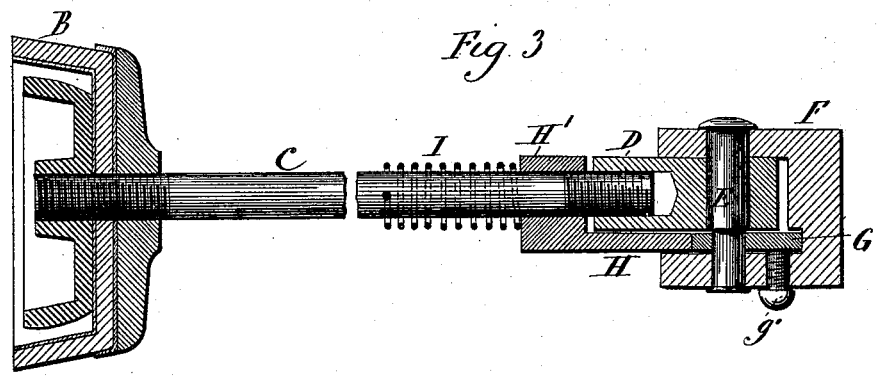

Figure 1, a view, partly in plan and partly in section, of a pneumatic door-check constructed in accordance with my invention and shown as when the door is closed; Fig. 2, a view in elevation showing the cylinder and plunger members of the check in the positions due to them just before they come together, and Fig. 3 an enlarged view of the said plunger member in vertical longitudinal section.

My invention relates to an improvement in pneumatic door-checks, the object being to produce a device which shall be at once simple, cheap, effective, and readily adjustable.

With these ends in view my invention consists in the combination, with a cylinder, of a plunger therefor, a stem for the plunger, a bracket having the inner end of the stem pivotally connected with it, a sliding spring-actuated cam mounted on the inner end of the stem, and an adjustable cam mounted on the said bracket for co-operation with the sliding cam, which retires to permit the stem to be swung on its pivot and then restores the stem to its normal position under the action of its spring.

My invention further consists in certain details of construction and combinations of parts, as will be hereinafter described, and pointed out in the claims.

As herein shown, the cylinder A, which may be of any approved construction, is provided at its inner end with an adjustable cap A', by means of which the inlet and egress of air is controlled, and with a flaring mouth $A^2$. The said cylinder is also provided upon its lower face with means, which are not shown, for attaching it to a door or a door-jamb. The plunger B, which may also be of any approved construction, is mounted upon the outer end of a stem C, the inner end whereof is threaded, and inserted into a block or holder D, which is hung upon a vertical pivot E in the bracket F, which is adapted to be secured either to a door or a door-jamb, the stem of the plunger being thus pivotally connected with the bracket. An adjustable cam G, swiveled on the pivot E, is constructed at its outer end with an open notch, forming two oppositely-inclined cam-faces $g$ $g$, its inner end being engaged by a screw $g'$, mounted in the bracket F, whereby the cam may be turned to any desired inclination with reference to the bracket and fixed therein by means of the said screw. The notch in the outer end of the said cam receives the correspondingly-beveled inner end H of a sliding cam, which also comprises a sleeve H', which passes over the inner end of the stem C and slides freely thereupon. A spiral spring I, abutting against the outer end of the said sleeve and attached at its opposite end to the stem, exerts a constant tendency to move the beveled end H of the cam into engagement with the adjustable cam G, before mentioned.

In using my improved device the cam G is set to coincide with the angle on which the plunger and cylinder members of the device come together when the door carrying one of them is closed, whereby the plunger will normally be sustained at the right angle by means of the sliding cam H' and the spring I. When, however, the plunger strikes the cylinder, or vice versa, the spring will be compressed and the sliding cam will ride upon one or the other of the two cam-faces G G of the adjustable cam, according to the direction in which the door swings, and as shown by Fig. 1 of the drawings, whereby the plunger is permitted to follow into the cylinder. When, however, the opening of the door clears the plunger from the cylinder, the spring will at once operate to push the sliding cam back to its normal position and sustain it therein, so that the plunger which responds to the sliding cam will be held in a state of readiness to properly engage with the cylinder again the next time they come together.

I would have it understood that I do not limit myself to the exact construction herein shown and described, but hold myself at liberty to make such changes and alterations therein as fairly fall within the spirit and scope of my invention.

Having fully described my invention, what I claim as new, and desire to secure by Letters Patent, is—

1. In a pneumatic door-check, the combination, with a cylinder, of a plunger therefor, a stem for the plunger, a bracket with which the inner end of the said stem is pivotally connected, a sliding spring-actuated cam mounted on the inner end of the stem, and an adjustable cam mounted on the bracket for co-operation with the said sliding cam, substantially as set forth.

2. In a pneumatic door-check, the combination, with a cylinder, of a plunger therefor, a stem for the plunger, a holder or block having the inner end of the stem mounted in it, a bracket in which the said holder or block is pivotally mounted, an adjustable cam swiveled in the said bracket and having its outer end provided with oppositely-inclined cam-faces forming an open notch, means for securing this cam in any desired position of adjustment on its swivel, a sliding cam mounted on the inner end of the stem and having a beveled inner end corresponding to the cam-faces of the adjustable cam, and a spring mounted on the stem and exerting a constant tendency to force the sliding cam into engagement with the adjustable cam, substantially as described.

In testimony whereof I have signed this specification in the presence of two subscribing witnesses.

GRANVILLE W. WRIGHT.

Witnesses:
WM. S. COOKE,
C. P. BEEBE.